United States Patent
Petrick et al.

(10) Patent No.: US 9,832,074 B2
(45) Date of Patent: Nov. 28, 2017

(54) CONVERGED INFRASTRUCTURE LOCAL MANAGEMENT SYSTEM

(71) Applicant: Dell Products L.P., Round Rock, TX (US)

(72) Inventors: Christopher Stephen Petrick, Cedar Park, TX (US); Rabah S. Hamdi, Spring, TX (US)

(73) Assignee: Dell Products L.P., Round Rock, TX (US)

( * ) Notice: Subject to any disclaimer, the term of this patent is extended or adjusted under 35 U.S.C. 154(b) by 394 days.

(21) Appl. No.: 14/081,507

(22) Filed: Nov. 15, 2013

(65) Prior Publication Data

US 2015/0142939 A1 May 21, 2015

(51) Int. Cl.
*G06F 15/167* (2006.01)
*G06F 15/173* (2006.01)
*H04L 12/24* (2006.01)

(52) U.S. Cl.
CPC ...... *H04L 41/0853* (2013.01); *H04L 41/0813* (2013.01); *H04L 41/0879* (2013.01)

(58) Field of Classification Search
CPC ............ H04L 41/0813; H04L 41/0853; H04L 41/0879; H04L 67/16; H04L 49/45; H04L 49/70; H04L 49/357; H04L 49/602; H04L 12/4641
USPC ........................................ 709/212, 223–224
See application file for complete search history.

(56) References Cited

U.S. PATENT DOCUMENTS

| | | | | |
|---|---|---|---|---|
| 6,182,134 B1 * | 1/2001 | Collins | ............... | H04L 41/044 709/224 |
| 6,308,205 B1 * | 10/2001 | Carcerano | ............ | H04L 41/0253 709/220 |
| 6,480,955 B1 * | 11/2002 | DeKoning | ............ | G06F 9/4411 709/220 |
| 7,257,827 B2 * | 8/2007 | Lee | ...................... | G11B 33/022 312/223.2 |
| 8,332,508 B1 * | 12/2012 | Burrell | ............... | H04L 12/4625 709/224 |
| 2006/0095662 A1 * | 5/2006 | Arnott | ................. | G06F 3/04847 711/114 |
| 2008/0165490 A1 * | 7/2008 | Buckland | ............ | G11B 33/128 361/679.33 |

(Continued)

*Primary Examiner* — Farzana Huq
(74) *Attorney, Agent, or Firm* — Haynes and Boone, LLP

(57) ABSTRACT

A converged infrastructure management system includes a first converged infrastructure system chassis housing a backplane. A plurality of managed devices are connected to the backplane and include at least one compute device, at least one network device, and at least one storage device. A management device is connected to the backplane and includes a display and an input device that are accessible on an outer surface of the management device. The management device includes a management engine that is configured to retrieve management information from any of the plurality of managed devices through the backplane and display the management information that was retrieved on the display. The management engine is also configured to receive instructions through the input device and, in response, modify the management information that is displayed and send the management information that has been modified through the backplane to the management device associated with that management information.

20 Claims, 11 Drawing Sheets

(56) References Cited

U.S. PATENT DOCUMENTS

| | | | |
|---|---|---|---|
| 2009/0063650 A1* | 3/2009 | Anslow | H04L 41/082 709/208 |
| 2010/0146592 A1* | 6/2010 | Gamare | G06F 11/2025 726/4 |
| 2012/0151097 A1* | 6/2012 | Lambert | G06F 3/0689 710/13 |
| 2012/0159029 A1* | 6/2012 | Krishnan | G06F 3/0626 710/301 |
| 2012/0209977 A1* | 8/2012 | Nakajo | G06F 8/65 709/223 |
| 2014/0344478 A1* | 11/2014 | Sunnapu | H04L 49/9068 709/250 |
| 2015/0026287 A1* | 1/2015 | Stevens | G06F 15/167 709/212 |
| 2015/0117448 A1* | 4/2015 | Winter | H04L 45/48 370/392 |

* cited by examiner

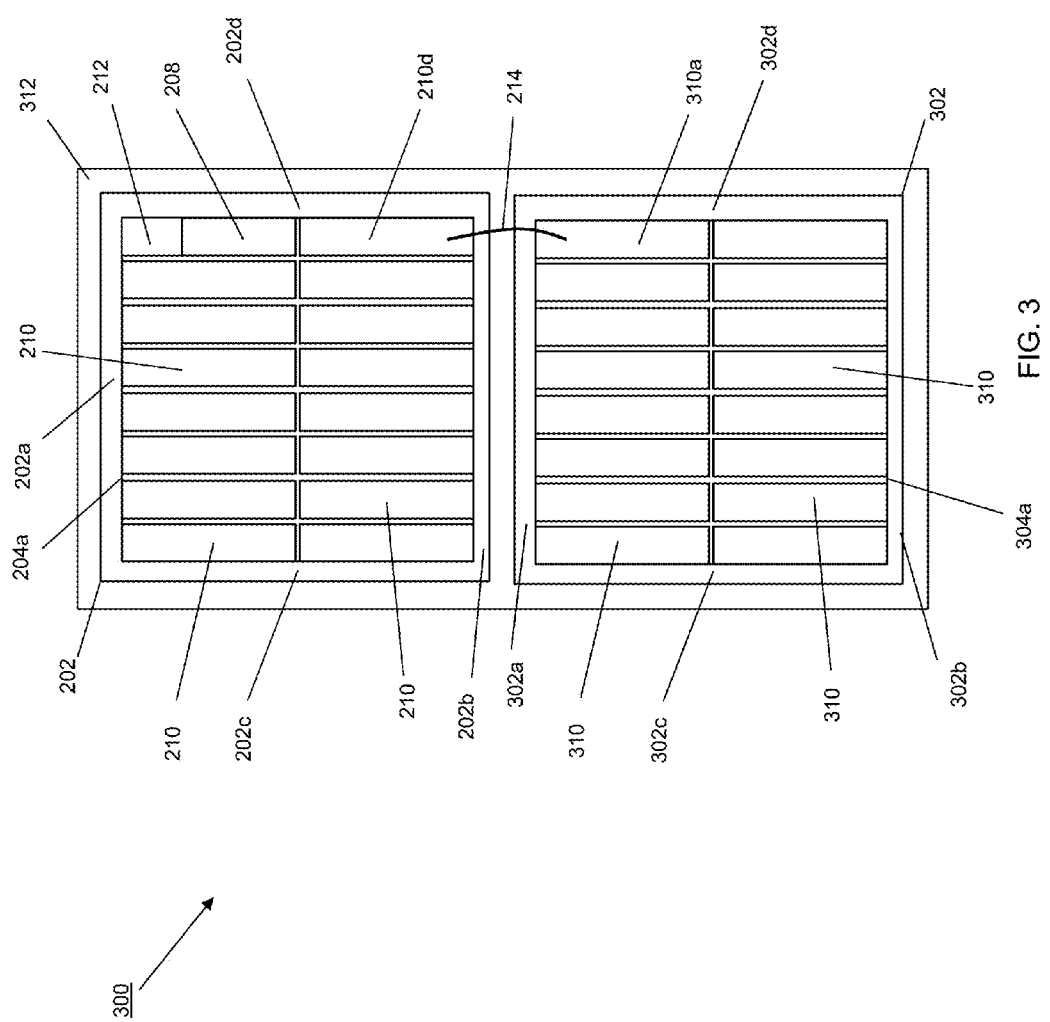

CONVERGED INFRASTRUCTURE LOCAL MANAGEMENT SYSTEM

BACKGROUND

The present disclosure relates generally to information handling systems, and more particularly to a local management system for IHSs provided in a converged infrastructure system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are sometimes provided in a converged infrastructure system in which multiple IHSs are packaged into an optimized computing solution that may include compute IHSs (e.g., server IHSs), network IHSs (e.g., switch IHSs), storage IHSs, software, and/or other converged infrastructure system components known in the art. Such converged infrastructure systems centralize IHS resources, consolidate IHSs, increase resource utilization, and lower costs by providing the IHSs for sharing by multiple applications. However, the management of converged infrastructure systems raises a number of issues. For example, a converged infrastructure system administrator or technician is typically presented with a complex array of installation, operational, and troubleshooting tasks for the converged infrastructure system that limit the ability to use a remote system connected to the converged infrastructure system to manage the IHSs in that converged infrastructure system. The use of such remote systems is further complicated by the fact that they may be a relatively far distance away from the converged infrastructure system, further limiting their usefulness for management of the converged infrastructure system if any situation comes up that requires the administrator to be physically located next to the converged infrastructure system. Local management of the converged infrastructure system typically requires that the administrator must use a mobile administrator IHS (e.g., a laptop IHS, a tablet IHS, etc.) to attempt to connect to and manage the IHSs in the converged infrastructure system. The use of mobile administrator IHSs for management is further complicated by the fact that the administrator may have no (or limited) network connectivity to the IHSs in the converged infrastructure system or their management functions, and firewalls are typically employed in converged infrastructure system locations (e.g., data centers) to prevent access to the converged infrastructure systems by unauthorized devices.

Accordingly, it would be desirable to provide an improved converged infrastructure management system.

SUMMARY

According to one embodiment, a converged infrastructure management system includes a first converged infrastructure system chassis; a backplane housed in the first converged infrastructure system chassis; a plurality of managed devices connected to the backplane, wherein the plurality of managed devices include at least one compute device, at least one network device, and at least one storage device; a management device connected to the backplane and including a display and an input device that are accessible on an outer surface of the management device, wherein the management device includes a management engine that is configured to: retrieve management information from any of the plurality of managed devices through the backplane; display the management information on the display; receive instructions through the input device and, in response, modify the management information that is displayed; and send the management information that has been modified through the backplane to the management device associated with that management information.

BRIEF DESCRIPTION OF THE DRAWINGS

FIG. 2b is a schematic view illustrating an embodiment of the converged infrastructure system of FIG. 2a.

FIG. 3 is a front view illustrating an embodiment of a plurality of converged infrastructure system including a plurality of converged infrastructure system chassis.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
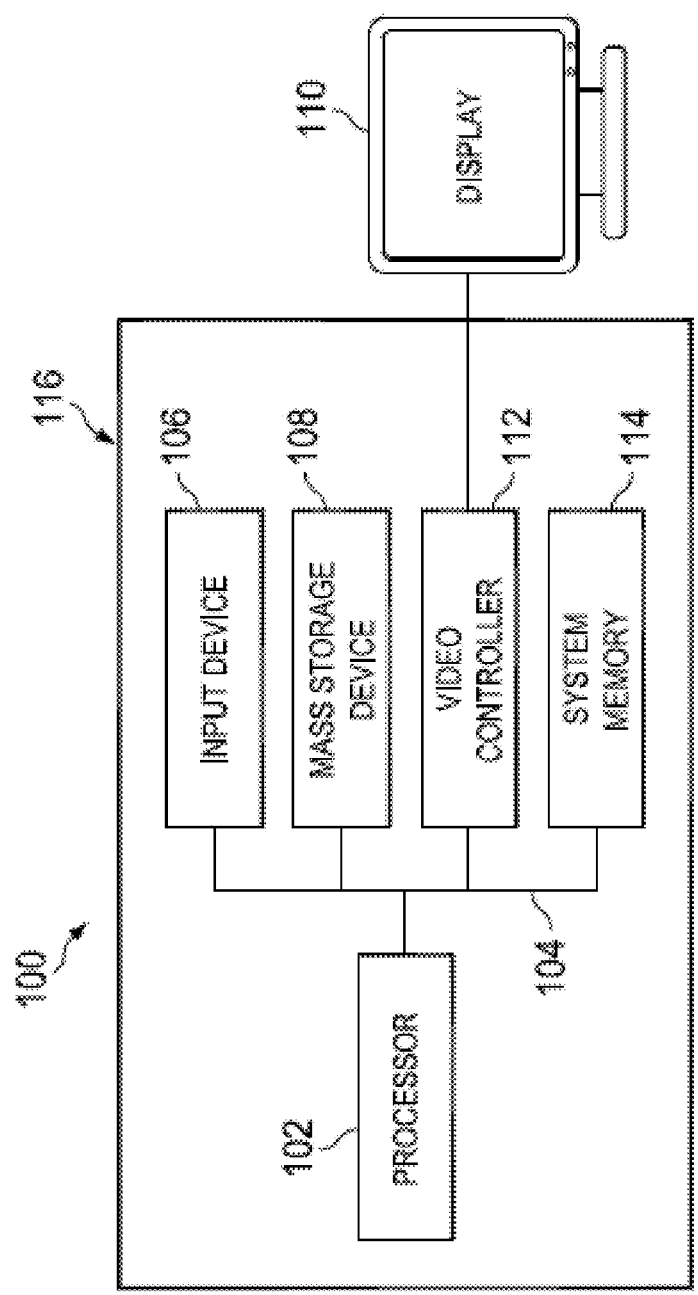
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
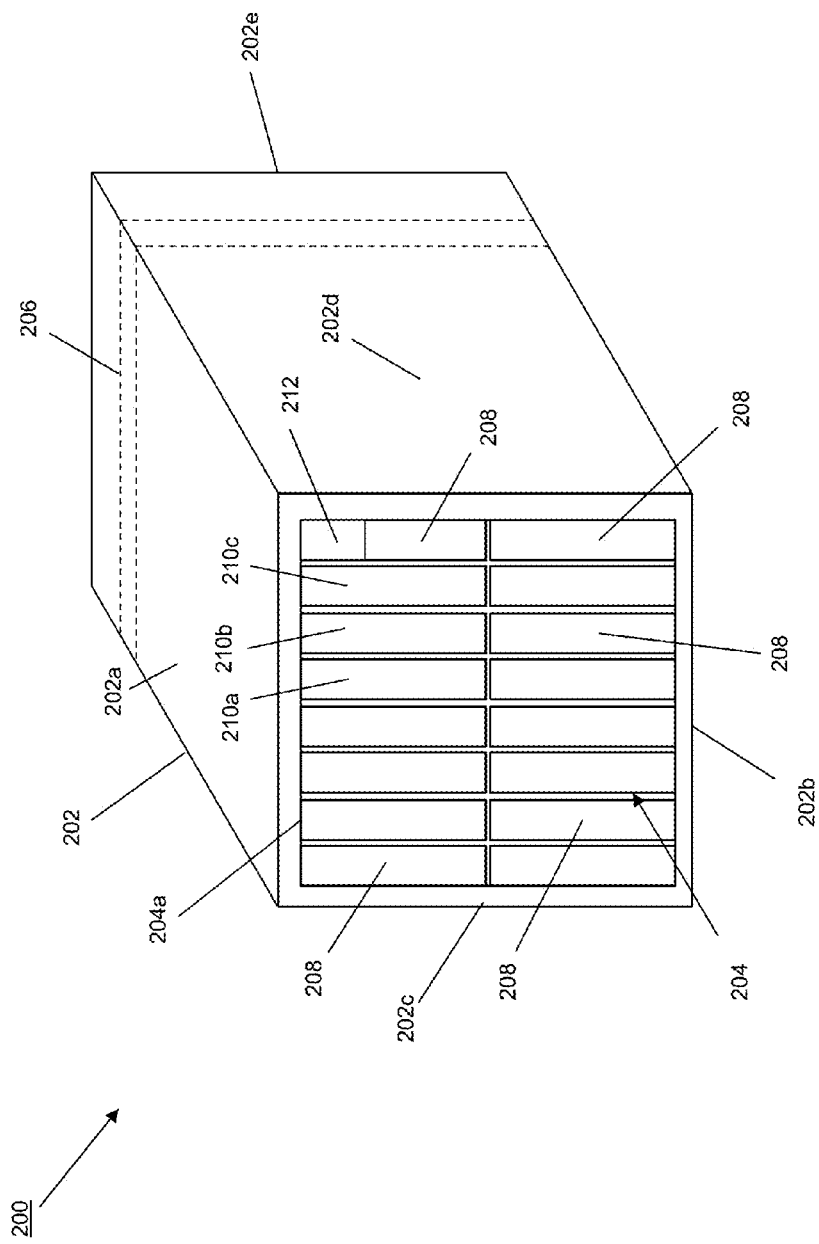
FIG. 2a is a perspective view illustrating an embodiment of a converged infrastructure system.
Figure 2B:
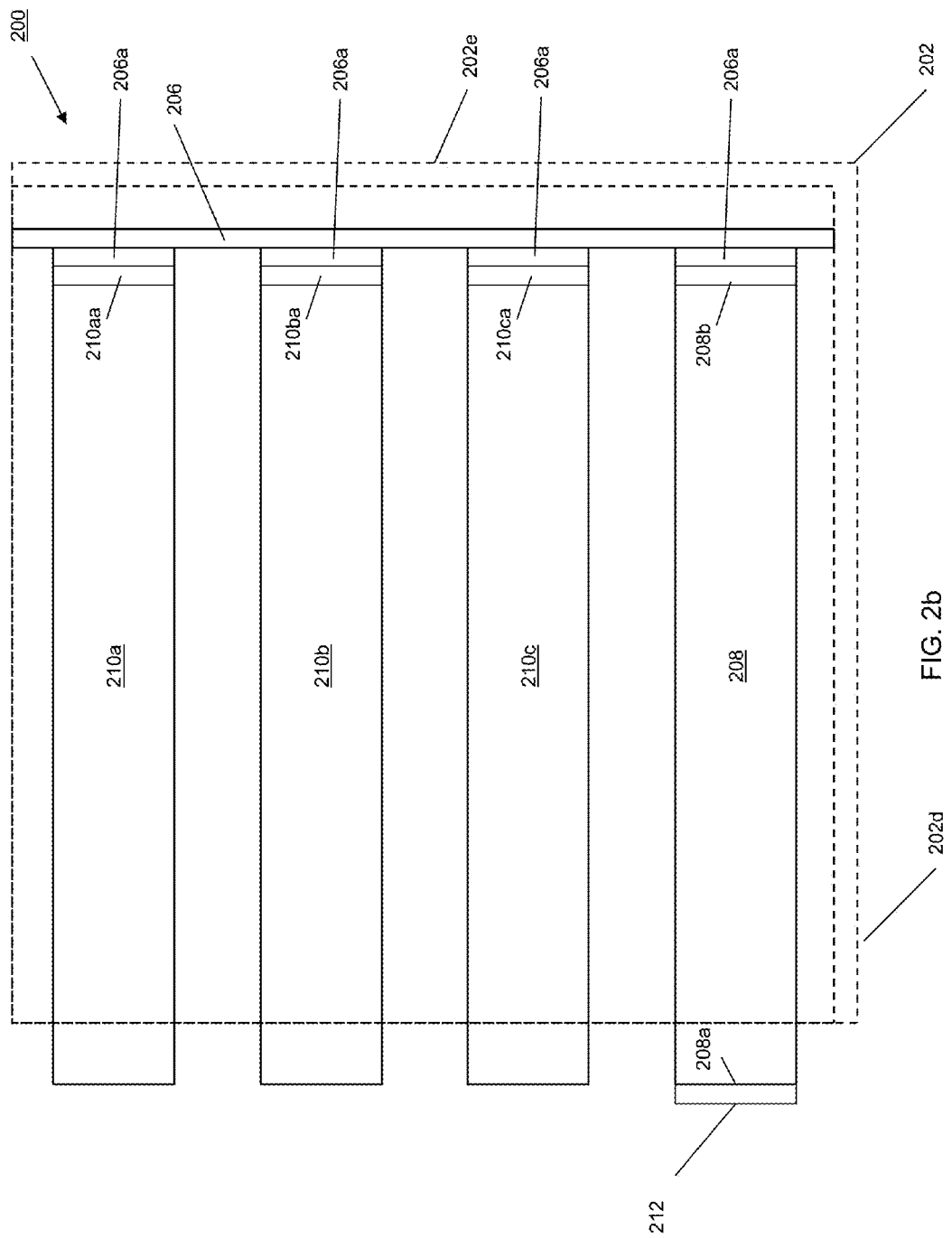

Referring now to FIGS. 2a and 2b, an embodiment of a converged infrastructure system 200 is illustrated. In an embodiment, the converged infrastructure system 200 packages multiple information handling systems (IHSs) into a single, optimized computing solution that may include compute devices such as server IHSs, storage devices such as storage IHSs, network devices such as switch IHSs, and software for IHS management, automation, and orchestration. Converged infrastructure systems may be used to centralize the management of resources, consolidate systems, increase utilization rates, and lower costs by creating pools of compute, storage, and network IHSs that can be shared by multiple applications and managed in a collective manner using policy driven processes. Converged infrastructure systems may be used in the provision of cloud computing services, including Infrastructure as a Service (IaaS), Platform as a Service (PaaS), and Software as a Service (SaaS), and for the provision of a variety of other converged infrastructure systems uses known in the art. Examples of converged infrastructure systems may include converged infrastructure systems provided using the PowerEdge M1000e blade enclosure available from Dell, Inc. of Round Rock, Tex., converged infrastructure systems provided using the PowerEdge VRTX shared infrastructure platform available from Dell, Inc. of Round Rock, Tex., and/or a variety of other converged infrastructure systems known in the art.

The converged infrastructure system 200 includes a converged infrastructure system chassis 202 having a top wall 202a, a bottom wall 202b located opposite the chassis 202 from the top wall 202a, a pair of side walls 202c and 202d located opposite the chassis 202 from each other and extending between the top wall 202a and the bottom wall 202b, and a rear wall 202e extending between the top wall 202a, the bottom wall 202b, and the side walls 202c and 202d. While the rear wall 202e is illustrated as a solid wall for clarity of illustration and discussion, one of skill in the art will recognize that the rear wall of a converged infrastructure system chassis may include a variety of components including fans, various connectors for connecting to components housed in the converged infrastructure system chassis 202, switches, Network Interface Controller (NIC) devices, Converged Network Adapter (CAN) devices, and/or a variety of other converged infrastructure system chassis features known in the art. A housing 204 is defined between the top wall 202a, the bottom wall 202b, the side walls 202c and 202d, and the rear wall 202e, and a housing entrance 204a is defined by edges of the top wall 202a, the bottom wall 202b, the side walls 202c and 202d that are opposite the rear wall 202e. In the embodiments discussed below, the housing 204 is divided up into a plurality of IHS housings that are configured to house IHSs, and as such, IHS support structures may be provided in the housing 204 to allow for the coupling, movement, and securing of each of a plurality of IHSs in the IHS housings provided by the housing 204. However, any manner for providing for the positioning of the plurality of IHSs in the housing 204 and their coupling to the converged infrastructure system chassis 202 will fall within the scope of the present disclosure.

A backplane 206 is located in the housing 204 of the converged infrastructure system chassis 202, and includes a plurality of IHS connectors 206a that extend from the backplane 206 and into the housing 204. In an embodiment, the backplane 204 may include a circuit board, one or more processors, a non-transitory memory, traces or other connections between the backplane features (e.g., the processor(s), memory, IHS connectors, etc.), and/or a variety of other backplane features known in the art that have not been illustrated for clarity. In an embodiment, the backplane 206 provides a management fabric for allowing the management operations discussed below. The management fabric interconnects managed IHSs and operates to provide a single user interface that provides for the management of those managed IHSs via a display device on one of the connected IHSs.

A management IHS 208 along with a plurality of managed IHSs 210 are located in the housing 204 and coupled to the converged infrastructure system chassis 202, including for reference to the discussion below, the managed IHSs 210a, 210b, and 210c. Any of the management IHS 208 and the managed IHSs 210 may be the IHS 100, discussed above with reference to FIG. 1, or include some or all of the components of the IHS 100. As discussed above, each of the management IHS 208 and the managed IHSs 210 may be located in the housing 204 and coupled to the converged infrastructure system chassis 202 via IHS housings that are provided by IHS support structures in the housing, along with coupling features on the chassis of each of the management IHS 208 and the managed IHSs 210, that allow for the coupling, movement, and securing of each of management IHS 208 and the managed IHSs 210 to the converged infrastructure system chassis 202.

Each of the management IHS 208 and the managed IHSs 210 are connected to the backplane 206 through the IHS connectors 206a that are mounted to the backplane 206. For example, FIG. 2b illustrates the management IHS 208 connected to the backplane 206 through the engagement of a backplane connector 208b that is located on the chassis of the management IHS 208 and one of the IHS connectors 206*a* on the backplane 206, the managed IHS 210*a* connected to the backplane 206 through the engagement of a backplane connector 210*aa* that is located on the chassis of the managed IHS 210*a* and one of the IHS connectors 206*a* on the backplane 206, the managed IHS 210*b* connected to the backplane 206 through the engagement of a backplane connector 210*ba* that is located on the chassis of the managed IHS 210*b* and one of the IHS connectors 206*a* on the backplane 206, and the managed IHS 210*c* connected to the backplane 206 through the engagement of a backplane connector 210*ca* that is located on the chassis of the managed IHS 210*c* and one of the IHS connectors 206*a* on the backplane 206. Thus, each of the management IHS 208 and the managed IHSs 210 are connected to each other, and other components on the backplane 206, through the backplane 206 (e.g., through traces on the backplane 206 between the IHS connectors 206*a* and other backplane components). While in the embodiment illustrated in FIG. 2*b*, each of the management IHS 208 and the managed IHSs 210*a-c* are illustrated as extending out of the IHS housing entrance 204*a*, any or all of the management IHS 208 and the managed IHSs 210*a-c* may be substantially flush with the IHS housing entrance 204*a*, or recessed from the IHS housing entrance 204*a* (e.g., such that their distal ends opposite their end connected to the backplane 206 is located in the housing 204.)

The managed IHSs 210 in the converged infrastructure system chassis 202 include at least one compute IHS, at least one network IHS, and at least one storage IHS. In the embodiments discussed below, the IHS 210*a* is a compute IHS such as, for example, a server IHS that is configured to provide a variety of computing functions known in the art for the converged infrastructure system 200; the IHS 210*b* is a network IHS such as, for example, a switch IHS that is configured to provide a variety of networking functions known in the art for the converged infrastructure system 200; and the IHS 210*c* is a storage IHS that is configured to provide a variety of storage functions known in the art for the converged infrastructure system 200. In different embodiments, the management IHS 208 may be any of a compute IHS, a network IHS, and/or a storage IHS that is configured to provide computing, networking, and/or storage functions, respectively, as well as the local management functions for the converged infrastructure system 200 that are discussed below. In some embodiments, the management IHS 210 may be a dedicated management IHS that operates to provide the local management functions for the converged infrastructure system 200 that are discussed below.

The management IHS 208 includes a display/input device 212 on an outer surface of the management IHS 208 that is located on a distal end 208*a* of the management IHS 208 that is opposite the end of the management IHS 208 that includes the backplane connector 208*b*. In the embodiments illustrated and described below, the display/input device 212 is provides a combination of a display and an input device in a touch input display. However, in other embodiments, the display/input device 212 may include a display screen (e.g., an LED display screen, an organic LED (OLED) display screen, etc.) and a separate input device such as a keyboard, a track pad, and/or a variety of other input devices known in the art. In an embodiment, the management IHS 208 includes a non-transitory memory having instructions that, when executed by one or more processors in the management IHS 208, cause the one or more processors to provide a management engine that is coupled to each of the backplane 206 (e.g., through the coupling of the one or more processors and the backplane 206) and the display/input device 212 (e.g., through the coupling of the one or more processors and the display/input device 212), and that is configured to perform the functions of the management IHS 208 discussed below.

Referring now to FIG. 3, an embodiment of a converged infrastructure system 300 is illustrated. The converged infrastructure system 300 illustrated in FIG. 3 essentially includes the components of the converged infrastructure system 200, discussed above with reference to FIG. 2, coupled to a converged infrastructure system chassis 302 that is similar to the converged infrastructure system chassis 202, includes an IHS housing (not illustrated for clarity) that is similar to the IHS housing 204, includes an IHS housing entrance 304*a* that is similar to the IHS housing entrance 204*a*, includes a backplane (not visible in FIG. 3) that is similar to the backplane 206, and includes a plurality of managed IHSs 310 that are similar to the managed IHSs 210. A rack 312 that defines a plurality of chassis housings is provided for housing each of the converged infrastructure system chassis 202 and the converged infrastructure system chassis 302, which are coupled to the rack 312 using coupling features on the converged infrastructure chassis 202 and 302 known in the art.

The converged infrastructure system 300 provides the management IHS 208 in the converged infrastructure system chassis 202 coupled to the managed IHSs 310 in the converged infrastructure system chassis 302. In the illustrated embodiment, a connecting cable 314 couples a managed IHS 210*d* in the converged infrastructure system chassis 202 to a managed IHS 310*a* in the converged infrastructure system chassis 302. In one example, the managed IHSs 210*d* and 310*a* may be network IHSs such as, for example, switch IHSs. In another embodiment, the management IHS 208 in the converged infrastructure system chassis 202 is coupled to the managed IHSs 310 in the converged infrastructure system chassis 302 through a connection (e.g., via a connecting cable or other connection known in the art) between the backplane 206 in the converged infrastructure system chassis 202 and the backplane in the converged infrastructure system chassis 302.

While the converged infrastructure system chassis 202 and the converged infrastructure system chassis 302 are illustrated as identical, converged infrastructure system chassis and components having different from factors and operating on different platforms (e.g., a converged infrastructure system provided using the PowerEdge M1000e blade enclosure and a converged infrastructure system provided using the PowerEdge VRTX shared infrastructure platform, both discussed above) may be used in the converged infrastructure system 300. Furthermore, while a few methods of coupling two converged infrastructure system chassis and components to provide the converged infrastructure system 300 have been described, any number of converged infrastructure system chassis may be coupled together (e.g., daisy-chained via cabling between network IHSs as illustrated in FIG. 3, via cabling between backplanes, etc.) using a variety of coupling techniques known in the art.

Figure 4:
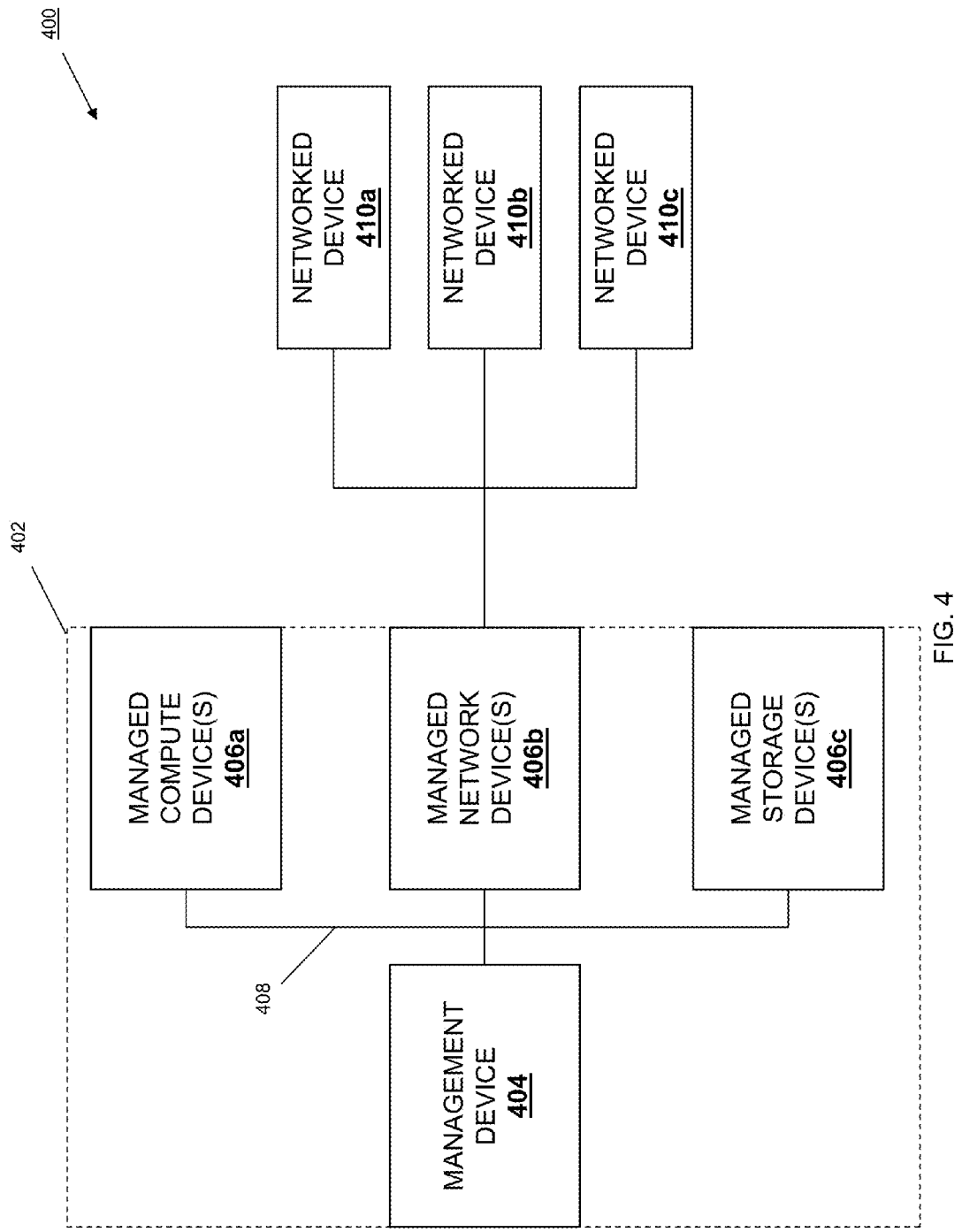
FIG. 4 is a schematic view illustrating an embodiment of a converged infrastructure system including connected devices.

Referring now to FIG. 4, an embodiment of a converged infrastructure system 400 is illustrated that includes features that may be provided in the converged infrastructure system 200 illustrated in FIGS. 2*a* and 2*b* or the converged infrastructure system 300 illustrated in FIG. 3. The converged infrastructure system 400 includes a converged infrastructure chassis 402 housing each of a management device 404, which may be the management IHS 208 discussed above with reference to FIGS. 2a, 2b, and/or 3, coupled to a plurality of managed devices 406, which may be the managed IHSs 210 and/or 310 discussed above with reference to FIGS. 2a, 2b, and/or 3, through a backplane 408. In the illustrated embodiment, the managed devices 406 include one or more managed compute devices 406a that may include the managed compute IHS 210a discussed above with reference to FIGS. 2a and 2b, one or more managed network devices 406b that may be the managed network IHS 210b discussed above with reference to FIGS. 2a and 2b, and one or more managed storage devices 406c that may be the managed storage IHS 210c discussed above with reference to FIGS. 2a and 2b.

In the converged infrastructure system 400, one or more connected devices 410 may be coupled to a managed device 406 (but not coupled to the backplane 408 in the converged infrastructure system chassis 402) to allow for management of the one or more connected devices 410 by the management device 404. For example, in the illustrated embodiment, a plurality of connected networked devices 410a, 410b, and 410c are coupled to at least one of the managed network devices 406b. In an embodiment, the connected networked devices 410a-c may be devices in a converged infrastructure system chassis that is not the converged infrastructure system chassis 402 (e.g., as illustrated in the converged infrastructure system 300 of FIG. 3), other compute IHSs, other network IHSs, other storage IHSs, Internet enabled phone(s) (e.g., a Voice over Internet Protocol (VoIP) phone), and/or a variety of other networked devices known in the art. While the connected networked devices 410a-c are illustrated coupled to the managed network device(s) 406b, other connected devices external to the chassis 402 may be connected to the other managed devices 406a and/or 406c, or directly to the management device 404 (but not to the backplane 408), while remaining within the scope of the present disclosure.

While a number of different embodiments of a converged infrastructure systems, converged infrastructure system components, and converged infrastructure configurations are illustrated and described herein, one of skill in the art in possession of the present disclosure will recognize that a wide variety of converged infrastructure systems known in the art but not specifically described herein will benefit from the teachings of the present disclosure and thus fall within its scope.

Figure 5:
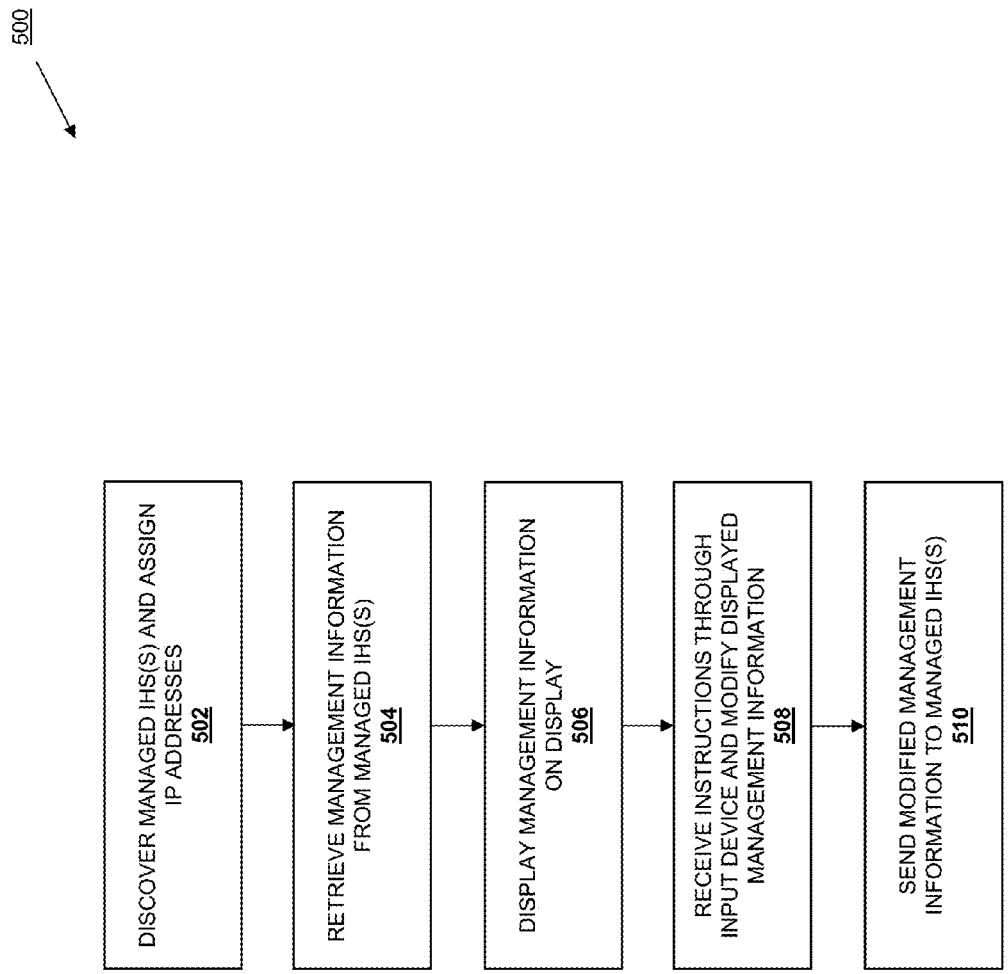
FIG. 5 is a flow chart illustrating an embodiment of a method for locally managing a converged infrastructure system.

Referring now to FIG. 5, an embodiment of a method 500 for managing a converged infrastructure system is illustrated. The method 500 may be performed using any of the converged infrastructure systems 200, 300, and 400 described above as discussed in detail below. Communications between the management IHS and the managed IHSs during the method 500 may be performed using management protocols such as, for example, Simple Network Management Protocol (SNMP), Command Line Protocol (CLI), Extensible Markup Language (XML) management protocol, and/or a variety of other management protocols known in the art. Furthermore, the management IHS may store login credentials for each of the managed IHS to further simply their management. The method 500 begins at block 502 where managed IHSs are discovered and assigned Internet Protocol (IP) addresses. In an embodiment, in response to powering on, starting up, and/or otherwise initiating the converged infrastructure system, the management IHS/device operates to discover, identify, or otherwise recognize managed IHSs/devices that are connected to the management IHS/device (e.g., via any of a variety of discovery protocols known in the art), and assign IP addresses to those managed IHSs/device (e.g., the management IHS/device may operate as, or include, a Dynamic Host Configuration Protocol (DHCP) server).

For example, with reference to the converged infrastructure system 200 of FIG. 2, at block 502 the management IHS 208 may operate to discovery each of the managed IHSs 210 that are connected to the backplane 206, and assign each of the managed IHSs 210 an IP address. In another example, with reference to the converged infrastructure system 300 of FIG. 3, at block 502 the management IHS 208 may operate to discovery each of the managed IHSs 210 in the converged infrastructure system chassis 202 that are connected to the backplane 206. In addition, at block 502 the management IHS 208 may operate to discover each of the managed IHSs 310 in the converged infrastructure system chassis 302 through the backplane 206, the managed device 210d, the connecting cable 214, the managed device 310a, and the backplane in the converged infrastructure system chassis 302. Following discovery of each of the managed IHSs 210 and the managed IHSs 310, the management IHS 208 may assign each of the managed IHSs 210 and 310 an IP address. In another example, with reference to the converged infrastructure system 400 of FIG. 4, at block 502 the management device 404 may operate to discovery each of the managed devices 406a-c in the converged infrastructure system chassis 402 that are connected to the backplane 408. In addition, at block 502 the management device 404 may operate to discover each of the connected networked devices 410a-c that are connect to the managed network device(s) 406b through the backplane 408 and the managed network device (s) 406b. Following discovery of each of the managed devices 406a-c and the connected networked devices 410a-c, the management IHS 404 may assign each of the managed network devices 406a-c and the connected networked devices 410a-c an IP address.

The method 500 then proceeds to block 504 where management information is retrieved from the managed IHSs. In an embodiment, following the discovery of each of the managed IHSs and assignment of IP addresses, the management IHS may communicate with managed IHSs to retrieve management information. In the embodiments illustrated below, the management information retrieved from each managed IHS includes configuration information such as a current configuration of the managed IHS, one or more other configurations for the managed device that may be selected, VLAN configurations, and/or a variety of other configuration information known in the art. In the embodiments illustrated below, the management information retrieved from each managed IHS also includes troubleshooting information such as a current status of the managed IHS, suggestions for correcting a current status, fault descriptions, fault status, misconfiguration status, and/or a variety of other troubleshooting information known in the art. However, while not illustrated, the management information retrieved at block 504 may also include fault information such as fault descriptions and/or status, accounting information such as license counting for managed IHSs, performance information such as network bandwidth usage, processor usage, and fan status, security information such as user log in credentials, 802.1x configurations, inventory information such as model numbers, serial numbers, and installed components, topology information such as chassis interconnection charts and configurations, power information such as power supply usage and condition, and/or a variety of other management information for performing a variety of other management tasks known in the art.

For example, with reference to the converged infrastructure system 200 of FIG. 2, at block 504 the management IHS 208 may operate to retrieve management information from each of the managed IHSs 210 through the backplane 206. In another example, with reference to the converged infrastructure system 300 of FIG. 3, at block 504 the management IHS 208 may operate to retrieve management information from each of the managed IHSs 210 in the converged infrastructure system chassis 202 through the backplane 206. In addition, at block 504 the management IHS 208 may operate to retrieve management information from each of the managed IHSs 310 in the converged infrastructure system chassis 302 through the backplane 206, the managed device 210d, the connecting cable 214, the managed device 310a, and the backplane in the converged infrastructure system chassis 302. In another example, with reference to the converged infrastructure system 400 of FIG. 4, at block 504 the management device 404 may operate to retrieve management information from each of the managed devices 406a-c in the converged infrastructure system chassis 402 through the backplane 406. In addition, at block 504 the management device 404 may operate to retrieve management information from each of the connected networked devices 410a-c that are connect to the managed network device(s) 406b through the backplane 408 and the managed network device(s) 406b.

Referring now to FIGS. 5, 6a, 6b, 6c, 6d, and 6e the method 500 then proceeds to block 506 where management information is displayed on the display. FIGS. 6a-6e illustrates a portion of a converged infrastructure system 600 that includes a management IHS 602, which may be the management IHS 208 discussed above, and a plurality of managed IHSs 604 and 606, which may be the managed IHSs 210b and 210c discussed above. However, the discussion with regard to FIGS. 6a-e may be applied to the converged infrastructures 300 or 400, discussed above, as well as to other converged infrastructure systems that would fall within the scope of the present disclosure. The management IHS 602 includes a display/input device 602a, which may be the display/input device 212 discussed above with reference to FIGS. 2a, 2b, and 3, that includes a touch input screen that is configured to display information and allow inputs through user engagement with the touch input screen in order to provide instructions to the management engine in the management IHS 602. However, as discussed above, separate display devices and input devices (e.g., keyboards, touch pads, etc.) may be provided as the display/input device 212 while remaining within the scope of the present disclosure. At block 506, the management IHS 602 operates to displays the management information, retrieved at block 504, on the display/input device 602a.

Figure 6A:
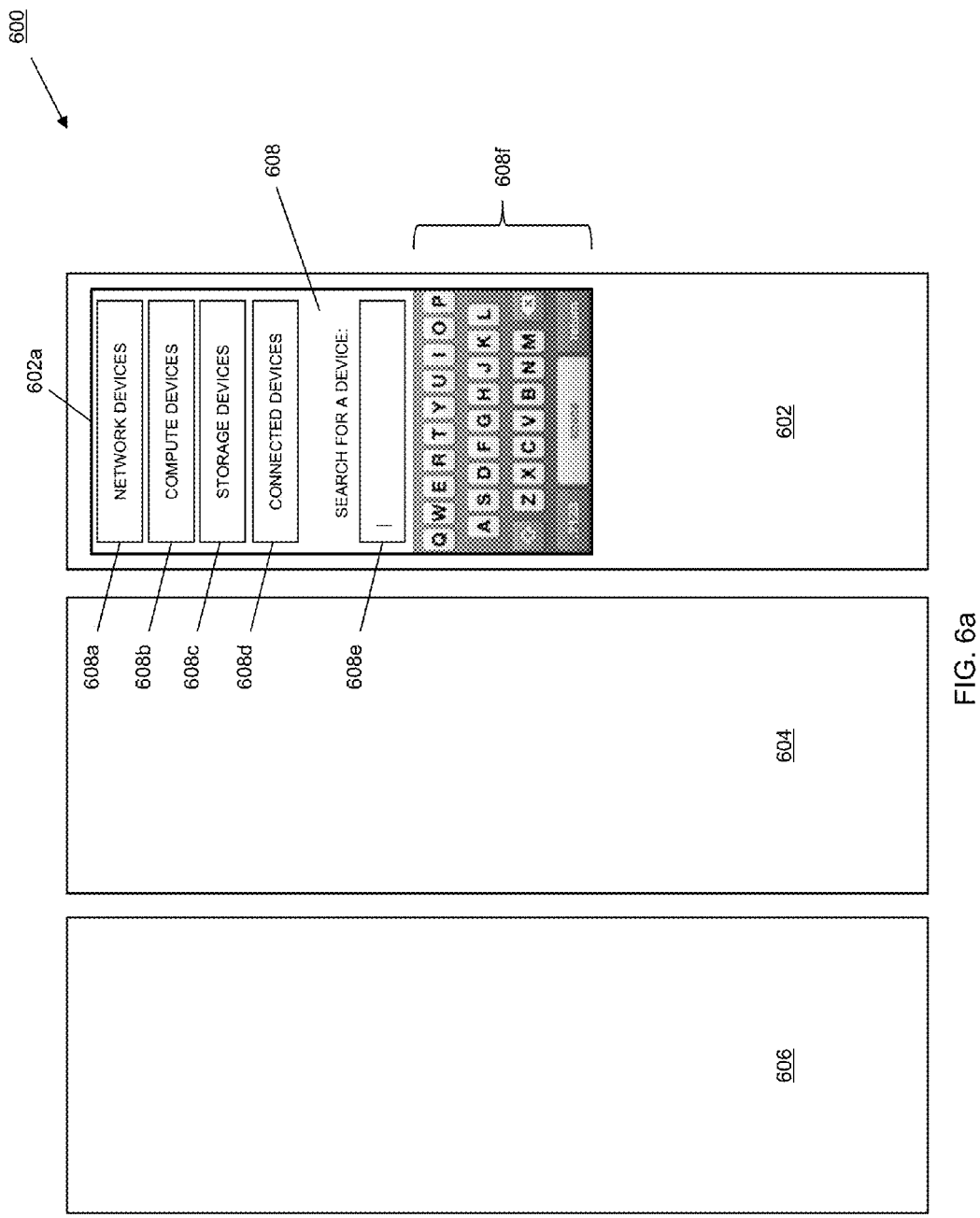
FIG. 6a is a front view illustrating an embodiment of the management of a converged infrastructure system.

Referring first to FIG. 6a, the display/input device 602a is illustrated displaying an embodiment of a management home screen 608. The management home screen 608 may display management information that details the types of managed devices (and connected devices, if present) that are connected to and managed by the management IHS 602. For example, in the embodiment illustrated in FIG. 6a, the management home screen 608 is displaying a network devices selector 608a that is selectable by a user to view details about each of the network IHSs connected to and managed by the management IHS 602, a compute devices selector 608b that is selectable by a user to view details about each of the compute IHSs connected to and managed by the management IHS 602, a storage devices selector 608c that is selectable by a user to view details about each of the storage IHSs connected to and managed by the management IHS 602, and a connected devices selector 608d that is selectable by a user to view details about each of the connected devices connected to a managed device that is connected to and managed by the management IHS 602. The management home screen 608 is also displaying a device search box 608e that allows a user to input an identifier for a particular device connected to and managed by the management IHS 602 (e.g., using the virtual keyboard 608f displayed on the management home screen 608) in order to view details about that particular device. While a specific user interface for the management home screen 608 that displays types of managed devices connected to a management device has been provided, managed devices may be presented to a user in a variety of manners such as, for example, based on their inclusion in a common chassis, based on a priority set by the user, etc.

Figure 6B:
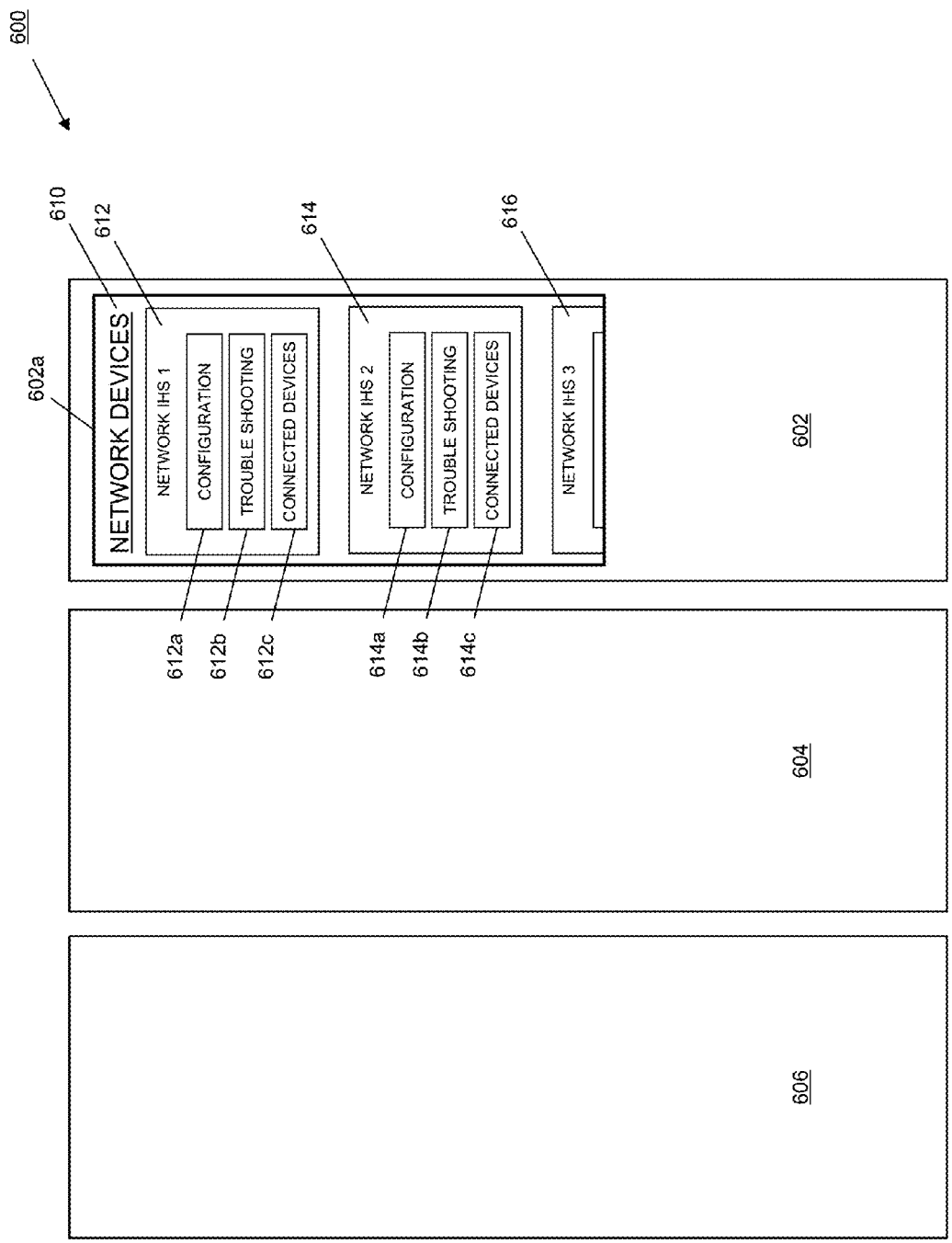
FIG. 6b is a front view illustrating an embodiment of the management of a converged infrastructure system

Referring now to FIG. 6b, the display/input device 602a is illustrated displaying an embodiment of a network devices management screen 610, which may be provided by the management engine in the management IHS 602 in response to a user selecting the network devices selector 608a displayed on the management home screen 608 in FIG. 6a. The network devices management screen 610 may display management information that details the managed network IHSs (and connected devices, if present) that are connected to and managed by the management IHS 602. For example, in the embodiment illustrated in FIG. 6b, the network devices management screen 610 is displaying a first managed network IHS section 612 for a first managed network IHS that is connected to and managed by the management IHS 602. The first managed network IHS section 612 includes a configuration selector 612a that is selectable by a user to view configuration information for the first managed network IHS, a troubleshooting selector 612b that is selectable by a user to view troubleshooting information for the first managed network IHS, and a connected devices selector 612c that is selectable by a user to view details about each of the connected devices connected to the first managed network IHS. The network devices management screen 610 is also displaying a second managed network IHS section 614 for a second managed network IHS that is connected to and managed by the management IHS 602. The second managed network IHS section 614 includes a configuration selector 614a that is selectable by a user to view configuration information for the second managed network IHS, a troubleshooting selector 614b that is selectable by a user to view troubleshooting information for the second managed network IHS, and a connected devices selector 614c that is selectable by a user to view details about each of the connected devices connected to the second managed network IHS. The network devices management screen 610 is also displaying a third managed network IHS section 616 that is substantially similar to the first managed network IHS section 612 and the second managed network IHS section 614, and the network devices management screen 610 may allow a user to scroll through any number of managed network IHS coupled to the management IHS 602.

While a specific example of a network devices management screen 610 displaying particular management information has been provided, that example has been simplified for clarity of illustration and discussion, and one of skill in the art in possession of the present disclosure will recognize that any of the management information retrieved at block 506 may be displayed on the network devices management screen 610. For example, management information including the location of each managed network IHS, fault issues with each managed network IHS, accounting information of each managed network IHS, performance information for each managed network IHS, security information for each managed network IHS, inventory information for each managed network IHS, topology information for each managed network IHS, power management information for each managed network IHS, and/or other management information known in the art may be displayed on the display/input device 602a at block 506. Furthermore, while only a network devices management screen 610 is illustrated and described herein, one of skill in the art in possession of the present disclosure will recognize that one or more compute devices management screens, storage devices management screens, and connected devices management screens may be provided to display management information retrieved from managed compute devices, managed storage devices, and/or connected devices connected to a managed device in substantially the same manner as described above for the network devices management screen 610.

Figure 6C:
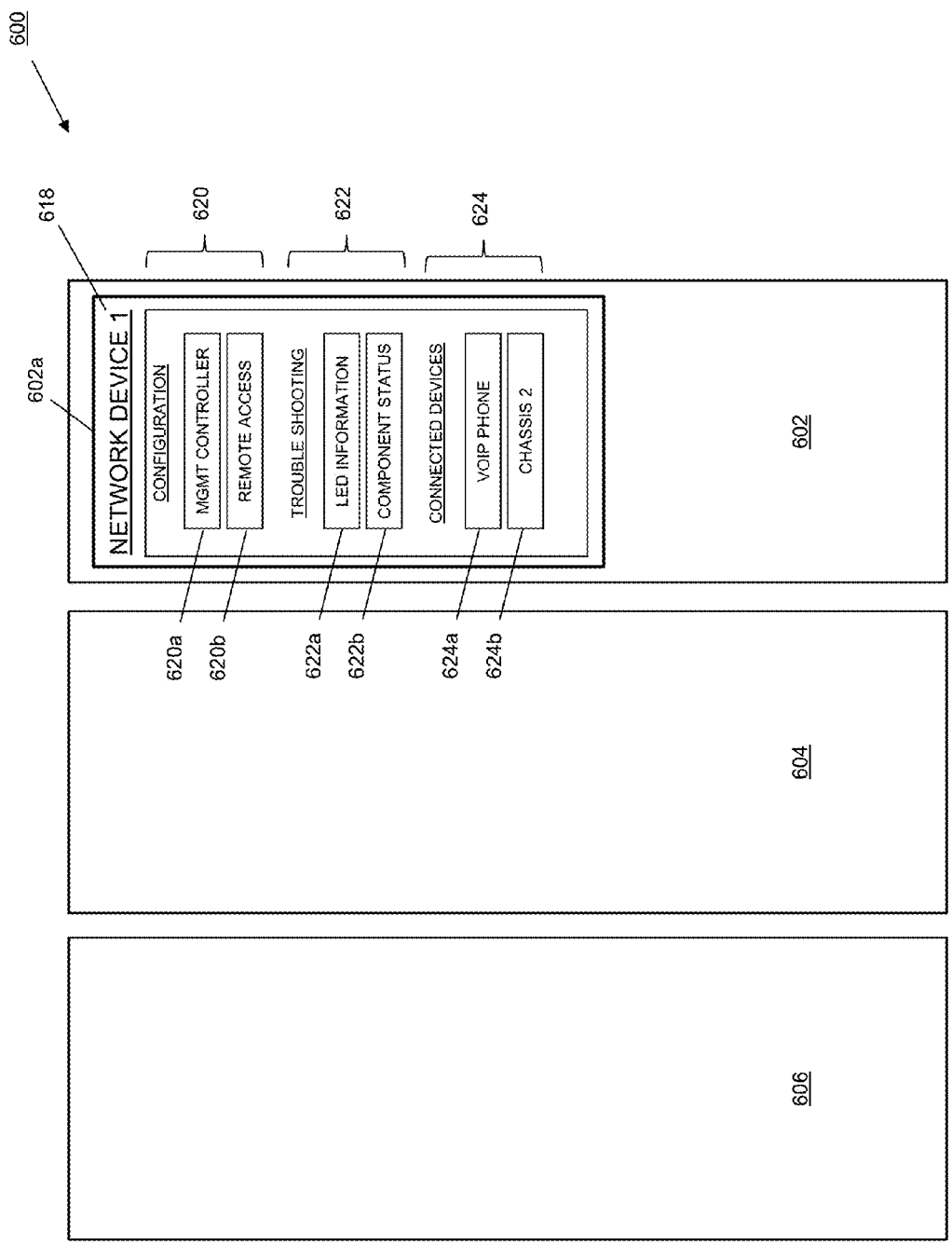
FIG. 6c is a front view illustrating an embodiment of the management of a converged infrastructure system.

Referring now to FIG. 6c, the display/input device 602a is illustrated displaying an embodiment of a first network device management screen 618, which may be provided by the management engine in the management IHS 602 in response to a user selecting the first managed network IHS section 612 and/or any of the configuration selector 612a, the troubleshooting selector 612b, and the connected devices selector 612c displayed on the network devices management screen 610 in FIG. 6b. The first network device management screen 618 may display management information that includes details about the first managed network IHS that is connected to and managed by the management IHS 602. For example, in the embodiment illustrated in FIG. 6c, the first network device management screen 618 is displaying a configuration section 620 for the first managed network IHS that is connected to and managed by the management IHS 602. The configuration section 620 includes a management controller selector 620a that is selectable by a user to view configuration information for a management controller in the first managed network IHS, and a remote access selector 620b that is selectable by a user to view configuration information for a remote access controller in the first managed network IHS. The first network device management screen 618 is also displaying a troubleshooting section 622 for the first managed network IHS that is connected to and managed by the management IHS 602. The troubleshooting section 622 includes an LED selector 622a that is selectable by a user to view troubleshooting information related to LEDs on the first managed network IHS, and a component status selector 622b that is selectable by a user to view troubleshooting information related to the status of components in the first managed network IHS. The first network device management screen 618 is also displaying a connected devices section 624 for the first managed network IHS that is connected to and managed by the management IHS 602. The connected devices section 624 includes a VoIP phone selector 624a that is selectable by a user to view connected device information about a VoIP phone connected to the first managed network IHS, and a second chassis selector 624b that is selectable by a user to view management information about devices in another chassis (e.g., the converged infrastructure system chassis 302 illustrated in FIG. 3) that is connected to the first managed network IHS.

In one example of block 506, the user may select the management controller selector 620a and cause the management engine to display a current configuration of the management controller in the first managed network IHS. In another example of block 506, the user may select the remote access selector 620b and cause the management engine to display a current configuration of the remote access controller in the first managed network IHS. In another example of block 506, the user may select the LED selector 622a and cause the management engine to display activated LEDs on the first managed network IHS, as well as information about the meaning of those activated LEDs for troubleshooting purposes. In another example of block 506, the user may select the component status selector 622b and cause the management engine to display the status of components in the first managed network IHS for troubleshooting purposes. In another example of block 506, the user may select the VoIP phone selector 624a and cause the management engine to display information about a VoIP phone connected to the first managed network IHS including, for example, settings or other phone information known in the art. In another example of block 506, the user may select the second chassis selector 624b and cause the management engine to display information about devices in a second chassis that is connected to the first managed network IHS (e.g., similar to the network devices management screen 610 but displaying each of the different devices in a converged infrastructure system chassis connected to the first managed network IHS.)

The method 500 then proceeds to block 508 where management information is modified based on instructions received through the input device. At block 508, the user may use the display/input device 602a to provide instructions to the management engine in the management IHS 602 to modify the management information that is being displayed in order to manage the managed devices (and/or connected devices, if present). While a few examples of the provision of instructions to modify management information are provided below, one of skill in the art in possession of the present disclosure will recognize that instructions may be provided at block 508 to modify any of the management information discussed herein while remaining within the scope of the present disclosure.

Figure 6D:
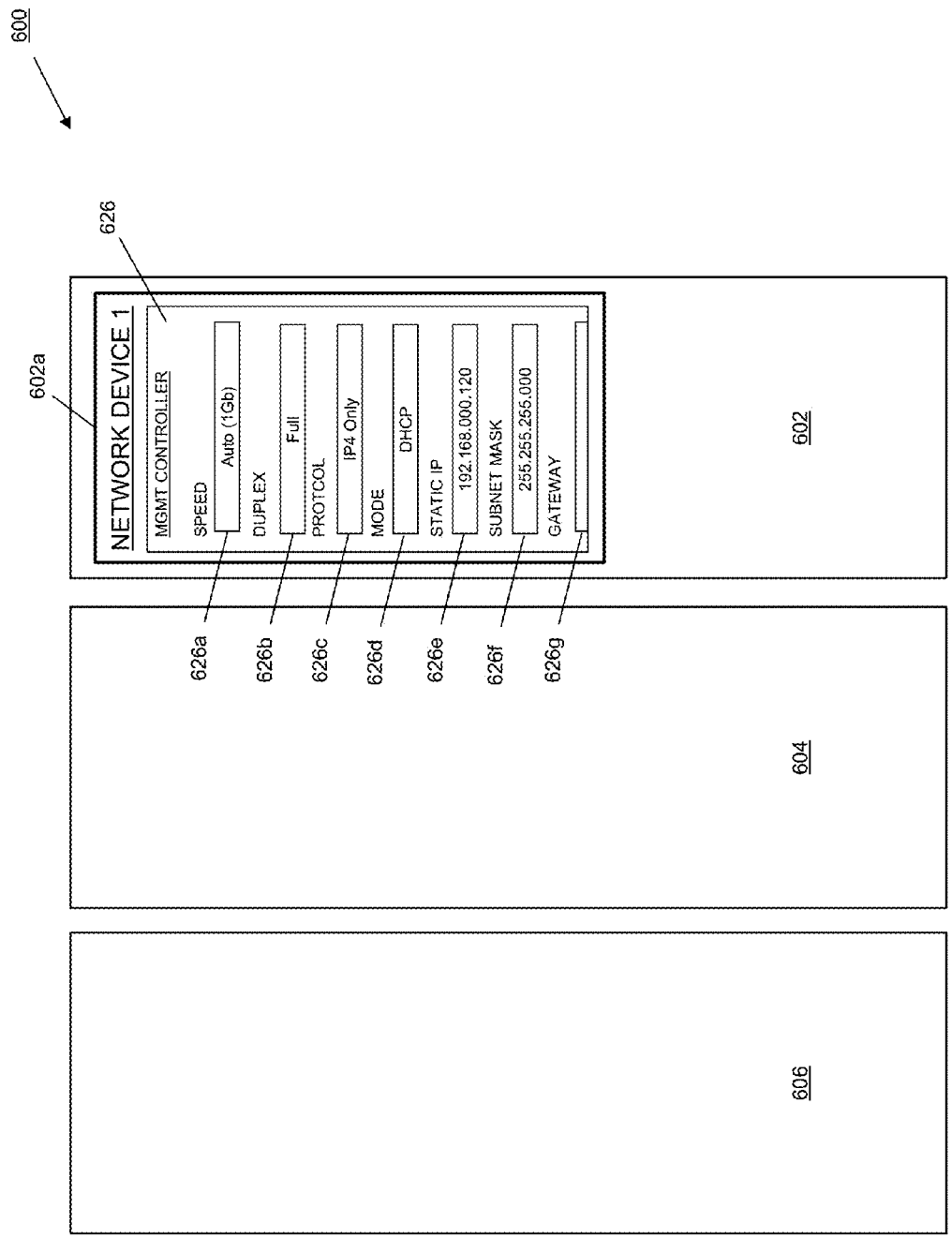
FIG. 6d is a front view illustrating an embodiment of the management of a converged infrastructure system

Referring now to FIG. 6d, the display/input device 602a is illustrated displaying an embodiment of a management controller configuration screen 626, which may be provided by the management engine in the management IHS 602 in response to a user selecting the management controller selector 620a on the first network device management screen 618 of FIG. 6c. The management controller configuration screen 626 may display configuration information for a management controller in the first managed network IHS, and may receive instructions to modify that configuration information. In one embodiment, the configuration information that is displayed in the configuration inputs the management controller configuration screen 626 illustrated in FIG. 6d may be a current configuration, and the user may use the configuration inputs to provide instructions to modify that current configuration. In another embodiment, the configuration information that is displayed in the configuration inputs the management controller configuration screen 626 illustrated in FIG. 6d may be modified configuration information following the user using the configuration inputs to provide instructions to modify a current configuration.

The management controller configuration screen 626 of FIG. 6d includes a speed configuration input 626a that may display a current speed configuration for the management controller in the first managed network IHS, and may be used by the user to provide instructions to modify a speed configuration for the management controller (e.g., management controller speed configurations may include the "Auto (1 Gb)" speed configuration illustrated, a 10 Mb speed configuration, a 100 Mb speed configuration, and/or a variety of other management controller speed configurations known in the art.) The management controller configuration screen 626 of FIG. 6*d* also includes a duplex configuration input 626*b* that may display a current duplex configuration for the management controller in the first managed network IHS, and may be used by the user to provide instructions to modify a duplex configuration for the management controller (e.g., management controller duplex configurations may include the "Full" duplex configuration illustrated, a Half duplex configuration, and/or a variety of other management controller duplex configurations known in the art.) The management controller configuration screen 626 of FIG. 6*d* also includes a protocol configuration input 626*c* that may display a current protocol configuration for the management controller in the first managed network IHS, and may be used by the user to provide instructions to modify a protocol configuration for the management controller (e.g., management controller protocol configurations may include the "IP4 Only" protocol configuration illustrated, an IP6 Only protocol configuration, a Both (IP4 and IP6) protocol configuration, and/or a variety of other management controller protocol configurations known in the art.)

The management controller configuration screen 626 of FIG. 6*d* also includes a mode configuration input 626*d* that may display a current mode configuration for the management controller in the first managed network IHS, and may be used by the user to provide instructions to modify a mode configuration for the management controller (e.g., management controller mode configurations may include the "DHCP" mode configuration illustrated, a static mode configuration, and/or a variety of other management controller mode configurations known in the art.) The management controller configuration screen 626 of FIG. 6*d* also includes a static IP configuration input 626*e* that may display a current static IP configuration for the management controller in the first managed network IHS, and may be used by the user to provide instructions to modify a static IP configuration for the management controller. The management controller configuration screen 626 of FIG. 6*d* also includes a subnet mask configuration input 626*f* that may display a current subnet mask configuration for the management controller in the first managed network IHS, and may be used by the user to provide instructions to modify a subnet mask configuration for the management controller. The management controller configuration screen 626 of FIG. 6*d* also includes a gateway configuration input 626*g* that may display a current gateway configuration for the management controller in the first managed network IHS, and may be used by the user to provide instructions to modify a gateway configuration for the management controller. While a few examples have been provided, any management controller configuration information may be displayed and modified on the management controller configuration screen 626.

Figure 6E:
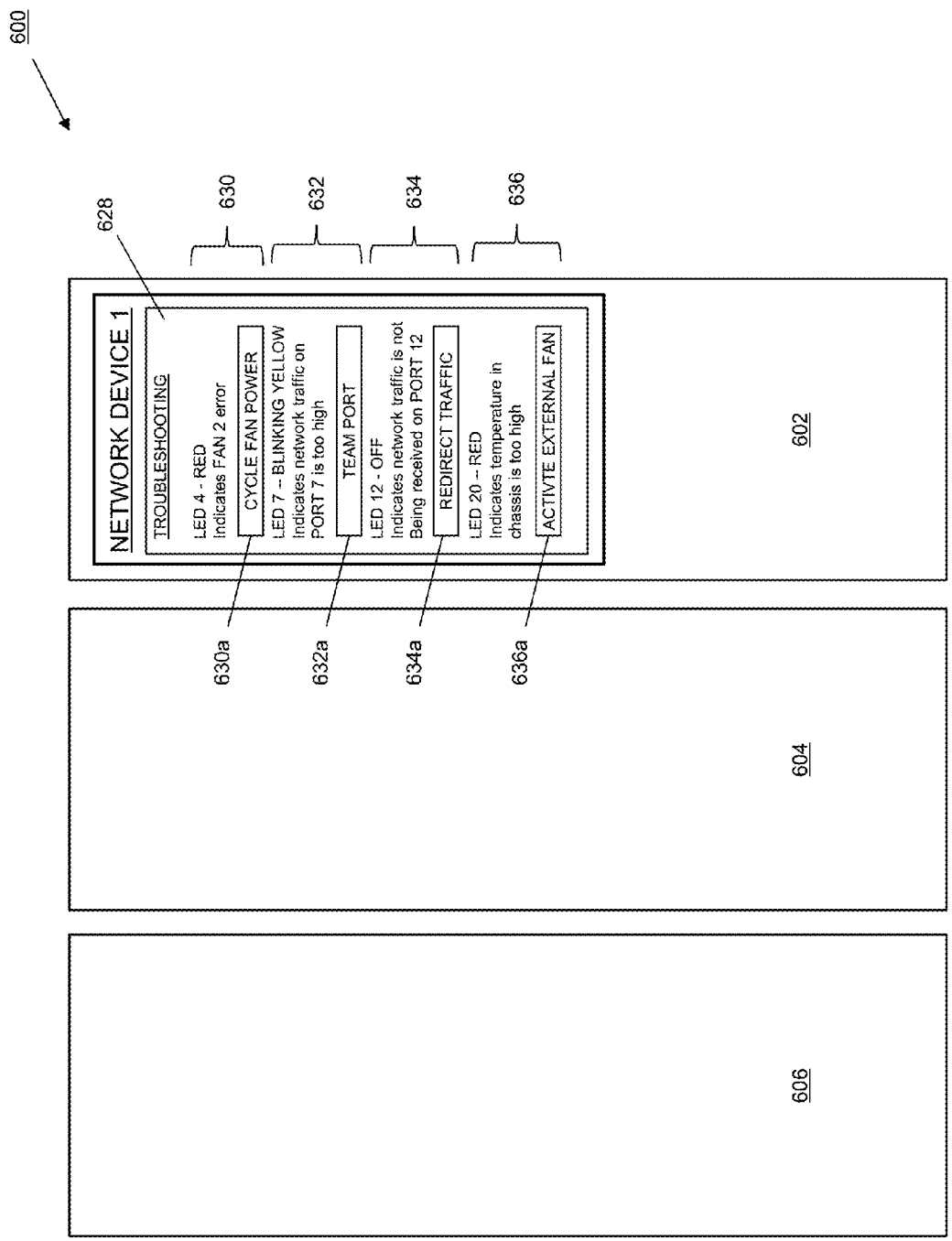
FIG. 6e is a front view illustrating an embodiment of the management of a converged infrastructure system

Referring now to FIG. 6*e*, the display/input device 602*a* is illustrated displaying an embodiment of a LED troubleshooting screen 628, which may be provided by the management engine in the management IHS 602 in response to a user selecting the LED selector 622*a* on the first network device management screen 618 of FIG. 6*c*. The LED troubleshooting screen 628 may display troubleshooting information for LEDs in the first managed network IHS, and may receive instructions related to that troubleshooting information. The LED troubleshooting screen 628 of FIG. 6*e* includes a first LED section 630 that includes information on an LED in the first managed network IHS (e.g., the LED 4 that is activated RED in the illustrated embodiment), troubleshooting information about that LED information (e.g., that it indicates a fan in the first managed network IHS has an error in the illustrated embodiment), and a troubleshooting input 630*a* that allows the user to provide an instruction to attempt to troubleshoot the problem indicated by the LED (e.g., by cycling the power to the fan in the illustrated embodiment.) The LED troubleshooting screen 628 of FIG. 6*e* also includes a second LED section 632 that includes information on an LED in the first managed network IHS (e.g., the LED 7 that is activated BLINKING RED in the illustrated embodiment), troubleshooting information about that LED information (e.g., that it indicates that network traffic on a port in the first managed network IHS is too high in the illustrated embodiment), and a troubleshooting input 632*a* that allows the user to provide an instruction to attempt to troubleshoot the problem indicated by the LED (e.g., by teaming the port that is experiencing high traffic with another port.)

The LED troubleshooting screen 628 of FIG. 6*e* also includes a third LED section 634 that includes information on an LED in the first managed network IHS (e.g., the LED 12 that is inactive in the illustrated embodiment), troubleshooting information about that LED information (e.g., that it indicates that network traffic is not being received on a port in the first managed network IHS in the illustrated embodiment), and a troubleshooting input 634*a* that allows the user to provide an instruction to attempt to troubleshoot the problem indicated by the LED (e.g., by redirecting traffic to another port in the first managed network IHS.) The LED troubleshooting screen 628 of FIG. 6*e* also includes a fourth LED section 636 that includes information on an LED in the first managed network IHS (e.g., the LED 20 that activated RED in the illustrated embodiment), troubleshooting information about that LED information (e.g., that it indicates that a temperature within the chassis of the first managed network IHS is too high in the illustrated embodiment), and a troubleshooting input 636*a* that allows the user to provide an instruction to attempt to troubleshoot the problem indicated by the LED (e.g., by activating an external fan.) While a few examples have been provided, any troubleshooting information may be displayed, and instructions received based on that trouble shooting information, on the LED troubleshooting screen 628.

The method then proceeds to block 510 where the modified management information is sent to the managed IHSs. In an embodiment, in response to receiving instructions to modify to any of the management information at block 508, the management engine modifies that management information and then sends that modified management information back to the managed IHS from which it was retrieved at block 504. For example, with reference to FIG. 6*d*, at block 510 the management engine may send any modified configuration information received through the management controller configuration screen 626 to the first managed network IHS so that the first managed network IHS may apply that modified configuration information to its management controller. Similarly, with reference to FIG. 6*e*, at block 510 the management engine may send any instructions that are related to the troubleshooting information and received through the LED troubleshooting screen 626 to the first managed network IHS so that the first managed network IHS may execute those instructions to troubleshoot a problem.

Thus, systems and methods have been described that provide for local management of a converged infrastructure system using a single visual management interface that provides for management of a plurality of managed devices that are all interconnected through a management fabric.

This single visual management interface connected to the managed devices through the management fabric allows for the direct connection to the managed devices without having to navigate firewalls. Furthermore the single visual management interface system may store login credentials for each of the managed devices to further simply their management. Other benefits of the single visual management interface include the ability to provide a common look and feel when managing any of the plurality of managed devices, providing visual management for devices that do not have visual management interface, ease of connectivity setup between the visual management interface and the managed devices, cost reductions due to the need to only provide the visual management interface on one device, space savings on managed devices due to their not needing a display for visual management, the ability to daisy-chain management fabrics to extend the reach of a visual management interface, port aggregation for out-of-band management ports from co-located networking equipment, and/or a variety of other benefits that will be apparent to one of skill in the art when in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A converged infrastructure management system, comprising:
   a first converged infrastructure system chassis;
   a backplane housed in the first converged infrastructure system chassis;
   a plurality of managed devices connected to the backplane and housed in the first converged infrastructure system chassis, wherein the plurality of managed devices include at least one compute device, at least one network device, and at least one storage device; and
   a management device connected to the backplane and housed in the first converged infrastructure system chassis, wherein the management device includes a display and an input device that are accessible on an outer surface of the management device, and wherein the management device includes a management engine that is configured to:
      retrieve management information from a managed device of the plurality of managed devices through the backplane;
      display the management information on the display;
      receive instructions through the input device and, in response, modify the management information that is displayed; and
      send the management information that has been modified through the backplane to the managed device associated with that management information, wherein the management information that has been modified includes instructions to change a configuration on the managed device.

2. The converged infrastructure management system of claim 1, further comprising:
   at least one connected device connected to a first managed device of the plurality of managed devices, wherein the management engine is configured to:
      retrieve management information from any of the at least one connected device through the backplane and the first managed device;
      display the management information that was retrieved on the display;
      receive instructions through the input device and, in response, modify the management information that is displayed; and
      send the management information that has been modified through the backplane and the first managed device to the at least one connected device associated with that management information.

3. The converged infrastructure management system of claim 1, further comprising:
   a second converged infrastructure system chassis housing a backplane and a managed device, wherein the backplane in the first converged infrastructure system chassis is connected to the backplane in the second converged infrastructure system chassis and the management engine is configured to:
      retrieve management information from the managed device in the second converged infrastructure system chassis;
      display the management information that was retrieved on the display;
      receive instructions through the input device and, in response, modify the management information that is displayed; and
      send the management information that has been modified to the managed device in the second converged infrastructure system chassis.

4. The converged infrastructure management system of claim 1, wherein the management device is at least one of a compute device, a network device, and a storage device.

5. The converged infrastructure management system of claim 1, wherein the plurality of managed devices include an Internet enabled phone.

6. The converged infrastructure management system of claim 1, wherein the management engine is configured to:
   discover each of the plurality of managed devices; and
   assign Internet Protocol (IP) addresses to each of the plurality of managed devices.

7. The converged infrastructure management system of claim 1, wherein the management information includes configuration information and troubleshooting information.

8. A management information handling system (IHS), comprising:
   an IHS chassis;
   a display located on an outer surface of the IHS chassis;
   an input device accessible on the outer surface of the IHS chassis;
   a backplane connector located on the IHS chassis, wherein the backplane connector is configured to connect to a backplane housed in a first converged infrastructure system chassis;
   a processor that is housed in the IHS chassis and that is coupled to each of the display and the input device; and
   a non-transitory memory coupled to the processor and including instructions that, when executed by the processor, cause the processor to provide a management engine that is configured to:
      retrieve management information from a managed IHS of a plurality of managed IHSs that are each connected to the backplane and housed in the first converged infrastructure system chassis when the IHS chassis is housed in the first converged infrastructure system chassis and the backplane connector is connected to the backplane, wherein the plurality of managed IHSs include at least one compute IHS, at least one network IHS, and at least one storage IHS;

display the management information on the display;

receive instructions through the input device and, in response, modify the management information that is displayed; and send the management information that has been modified through the backplane to the managed IHS associated with that management information, wherein the management information that has been modified includes instructions to change a configuration on the managed IHS.

9. The management IHS of claim 8, wherein the management engine is configured to:

retrieve management information from any of at least one connected IHS that is connected to a first managed IHS of the plurality of managed IHSs;

display the management information that was retrieved on the display;

receive instructions through the input device and, in response, modify the management information that is displayed; and send the management information that has been modified through the backplane and the first managed IHS to the at least one connected IHS associated with that management information.

10. The management IHS of claim 8, wherein the management engine is configured to:

retrieve management information from a managed IHS in a second converged infrastructure system chassis that includes a backplane that is connected to the backplane in the first converged infrastructure system chassis;

display the management information that was retrieved on the display;

receive instructions through the input device and, in response, modify the management information that is displayed; and send the management information that has been modified to the managed IHS in the second converged infrastructure system chassis.

11. The management IHS of claim 8, wherein the management IHS is at least one of a compute IHS, a network IHS, and a storage IHS.

12. The management IHS of claim 8, wherein the plurality of managed IHSs include an Internet enabled phone.

13. The management IHS of claim 8, wherein the management engine is configured to:

discover each of the plurality of managed IHSs; and assign Internet Protocol (IP) addresses to each of the plurality of managed IHSs.

14. The management IHS of claim 8, wherein the management information includes configuration information and troubleshooting information.

15. A method for managing a converged infrastructure system, comprising:

retrieving, by a management information handling system (IHS) that is housed in a first converged infrastructure system chassis through a backplane that is housed in the first converged infrastructure system chassis, management information from a managed IHS of a plurality of managed IHSs that are coupled to the backplane and housed in the first converged infrastructure system chassis, wherein the plurality of managed IHSs include at least one compute IHS, at least one network IHS, and at least one storage IHS;

displaying the management information on a display that is located on an outer surface of a management IHS chassis that houses the management IHS;

receiving instructions through an input device that is accessible on the outer surface of the management IHS chassis and, in response, modifying the management information that is displayed; and sending, by the management IHS through the backplane, the management information that has been modified to the managed IHS associated with that management information, wherein the management information that has been modified includes instructions to change a configuration on the managed IHS.

16. The method of claim 15, further comprising:

retrieving management information from any of at least one connected IHS that is connected to a first managed IHS of the plurality of managed IHSs;

displaying the management information that was retrieved on the display;

receiving instructions through the input device and, in response, modify the management information that is displayed; and sending the management information that has been modified to the at least one connected IHS associated with that management information.

17. The method of claim 15, further comprising:

retrieving management information from a managed IHS in a second converged infrastructure system chassis that includes a backplane that is connected to the backplane in the first converged infrastructure system chassis;

displaying the management information that was retrieved on the display;

receiving instructions through the input device and, in response, modify the management information that is displayed; and sending the management information that has been modified to the managed IHS in the second converged infrastructure system chassis.

18. The method of claim 15, wherein the management IHS is at least one of a compute IHS, a network IHS, and a storage IHS.

19. The method of claim 15, further comprising:

discovering, by the management IHS though the backplane, each of the plurality of managed IHSs; and assigning, by the management IHS, Internet Protocol (IP) addresses to each of the plurality of managed IHSs.

20. The method of claim 15, wherein the management information includes configuration information and troubleshooting information.

* * * * *